(12) United States Patent
Ducos

(10) Patent No.: US 9,145,204 B2
(45) Date of Patent: Sep. 29, 2015

(54) DEVICE FOR UNLOCKING AN UNDERCARRIAGE IN A DEPLOYED POSITION, AND AN UNDERCARRIAGE FITTED WITH SUCH A DEVICE

(75) Inventor: Dominique Ducos, Savigny sur Orge (FR)

(73) Assignee: MESSIER-BUGATTI-DOWTY, Velizy Villacoublay (FR)

( * ) Notice: Subject to any disclaimer, the term of this patent is extended or adjusted under 35 U.S.C. 154(b) by 57 days.

(21) Appl. No.: 13/697,841

(22) PCT Filed: May 17, 2011

(86) PCT No.: PCT/EP2011/057993
§ 371 (c)(1),
(2), (4) Date: Jan. 29, 2013

(87) PCT Pub. No.: WO2011/144629
PCT Pub. Date: Nov. 24, 2011

(65) Prior Publication Data
US 2013/0119197 A1 May 16, 2013

(30) Foreign Application Priority Data
May 18, 2010 (FR) ...................................... 10 53841

(51) Int. Cl.
*B64C 25/14* (2006.01)
*B64C 25/20* (2006.01)
*B64C 25/26* (2006.01)

(52) U.S. Cl.
CPC ................ *B64C 25/20* (2013.01); *B64C 25/26* (2013.01)

(58) Field of Classification Search
USPC .............................. 244/102 R, 102 A, 102 SL
See application file for complete search history.

(56) References Cited

U.S. PATENT DOCUMENTS

| | | | | | |
|---|---|---|---|---|---|
| 2,579,180 | A | * | 12/1951 | Eldred | 244/104 FP |
| 3,556,440 | A | * | 1/1971 | Lallemant | 244/104 R |
| 4,720,063 | A | * | 1/1988 | James et al. | 244/102 R |
| 5,110,068 | A | * | 5/1992 | Grande et al. | 244/102 SL |
| 5,207,398 | A | * | 5/1993 | Veaux et al. | 244/100 R |

(Continued)

FOREIGN PATENT DOCUMENTS

| | | |
|---|---|---|
| EP | 0 555 121 A1 | 8/1993 |
| FR | 2 928 623 A1 | 9/2009 |

OTHER PUBLICATIONS

International Search Report for PCT/EP2011/057993 dated Mar. 15, 2012.

*Primary Examiner* — Brian M O'Hara
*Assistant Examiner* — Keith L Dixon
(74) *Attorney, Agent, or Firm* — Sughrue Mion, PLLC

(57) ABSTRACT

A simple device for blocking and unblocking the locking member of an undercarriage having a breaker strut and including an unlocking device. The device comprises a rotary actuator of axis parallel to the hinge axis of the links of the stabilizing member; a crank connected to a shaft of the actuator; a pawl hinged to the end of the crank and including a step; a pin secured to and at a distance from one of the links of the stabilizing member; and return means for urging the pawl towards the pin. The actuator is actuatable between a first angular position in which the pin is in contact with the pawl facing the step while the links are substantially in alignment, and a second angular position that the crank reaches when the step of the pawl has pushed back the pin, taking the links of the stabilizer member out of alignment.

4 Claims, 4 Drawing Sheets

(56) References Cited

U.S. PATENT DOCUMENTS

| | | |
|---|---|---|
| 5,269,481 A | 12/1993 | Derrien |
| 5,429,323 A * | 7/1995 | Derrien et al. ............ 244/102 R |
| 7,731,124 B2 * | 6/2010 | Griffin ...................... 244/102 R |
| 8,602,352 B2 * | 12/2013 | Keller et al. ............... 244/102 A |
| 2009/0108131 A1 * | 4/2009 | Lavigne et al. ............ 244/102 A |
| 2011/0163202 A1 | 7/2011 | Martinez et al. |

* cited by examiner

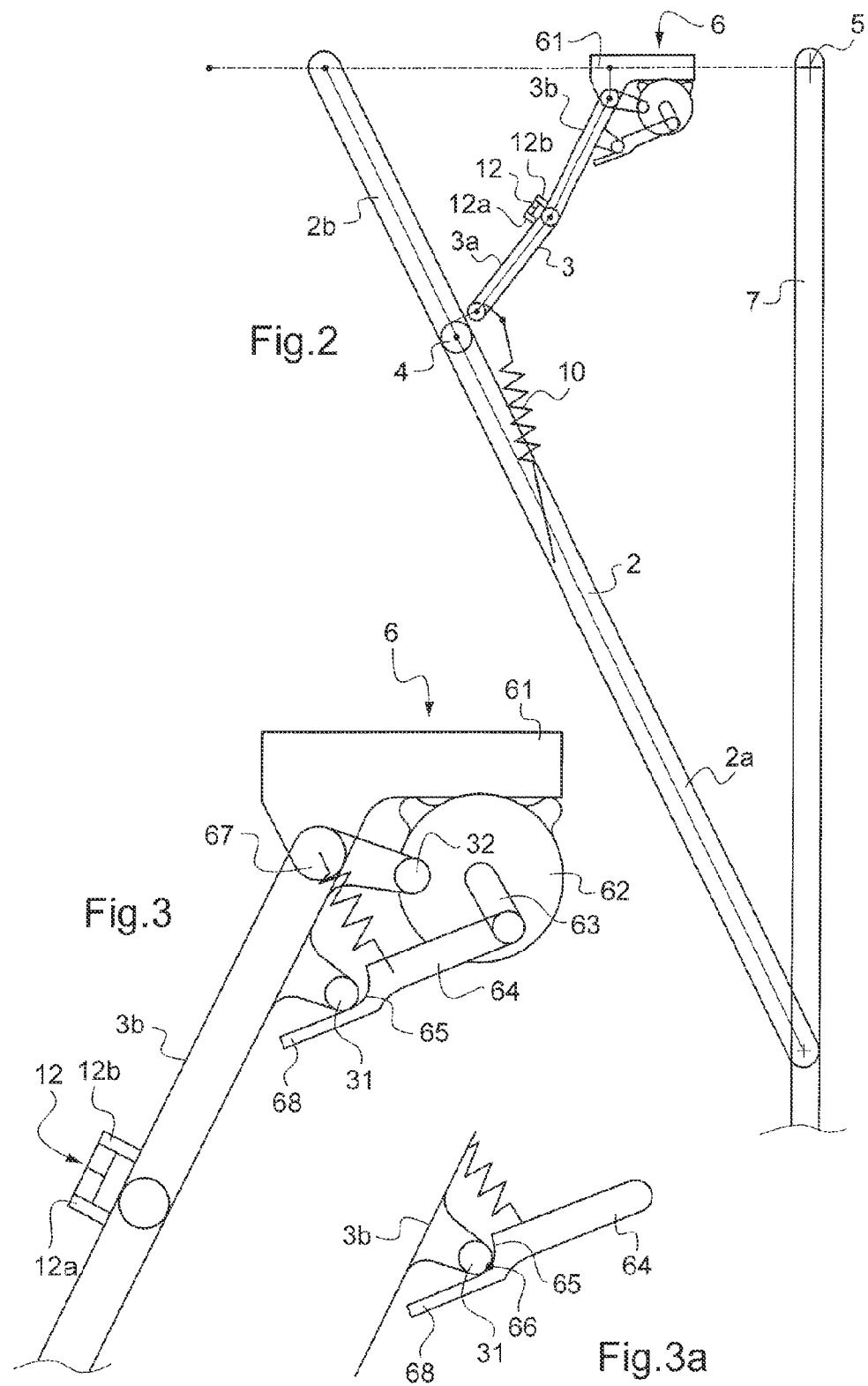

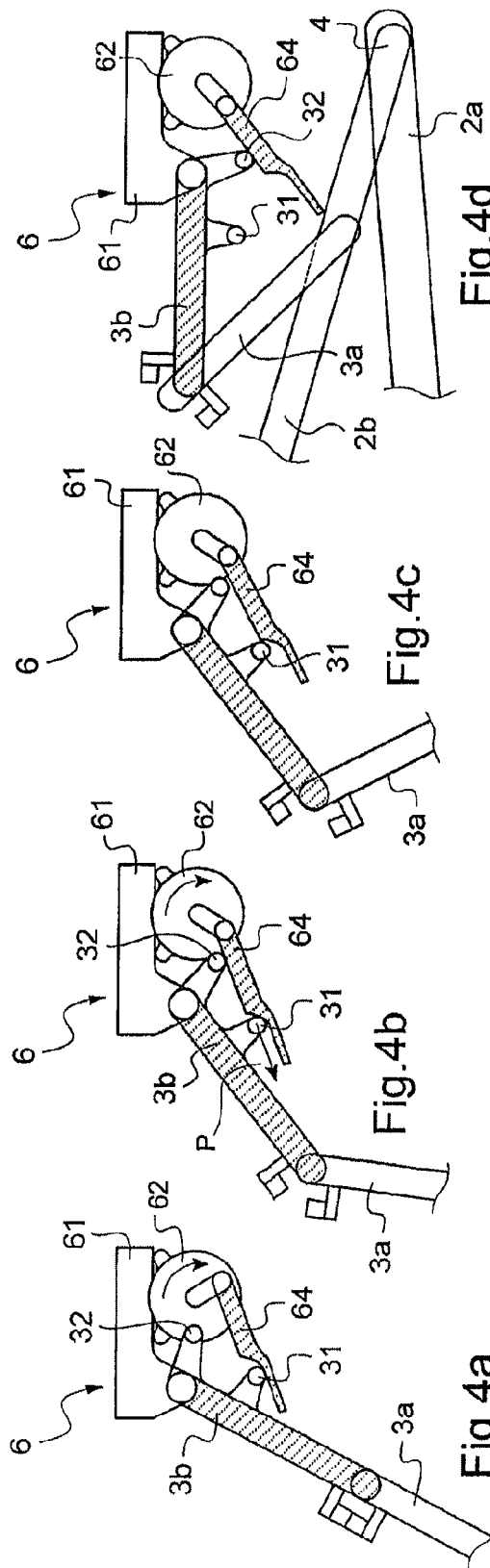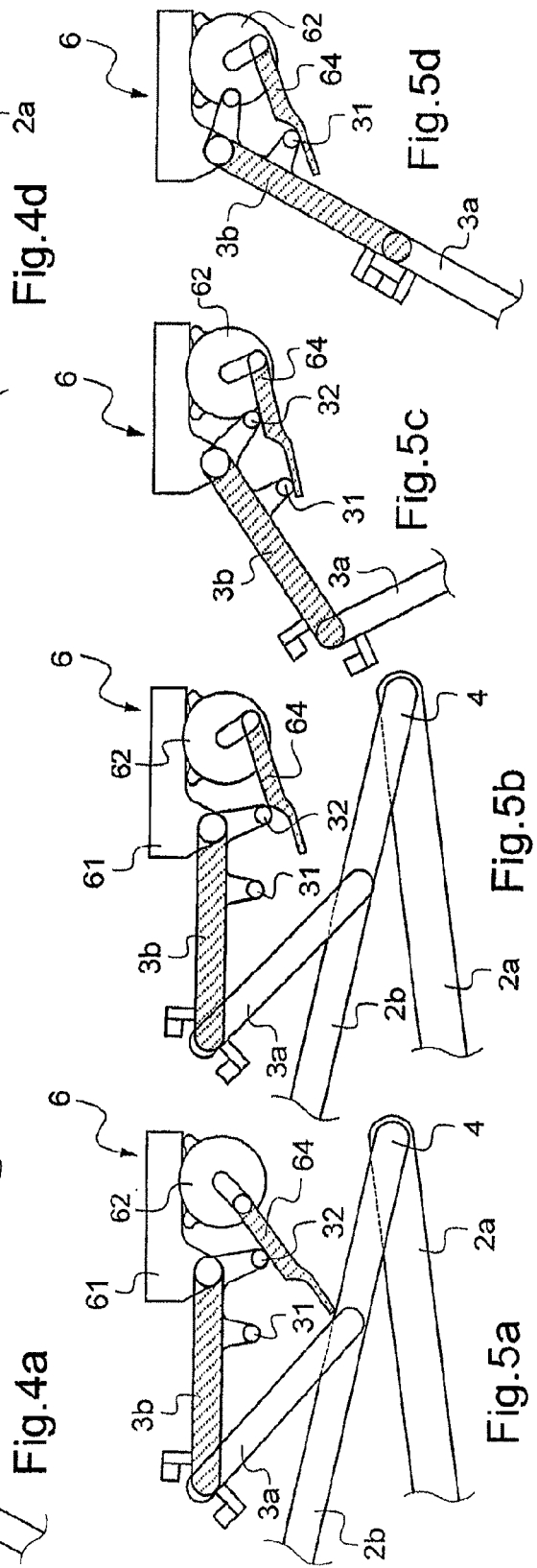

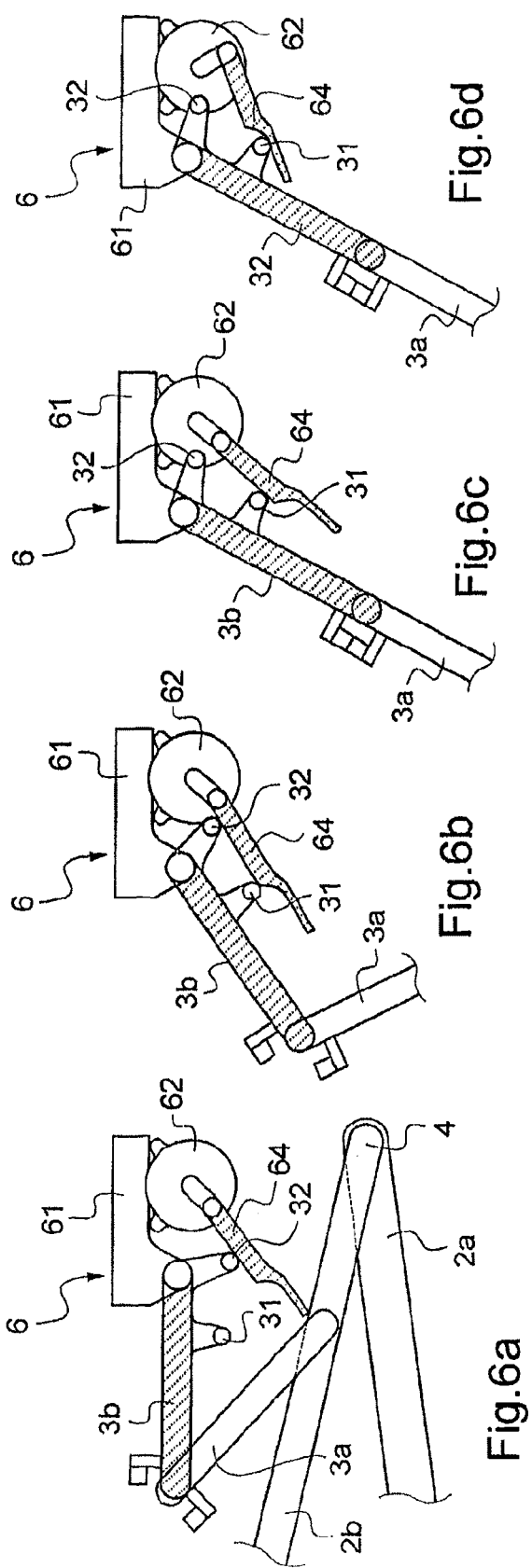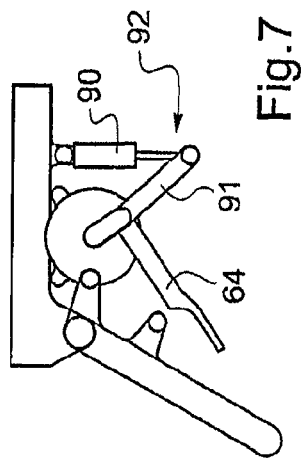

DEVICE FOR UNLOCKING AN UNDERCARRIAGE IN A DEPLOYED POSITION, AND AN UNDERCARRIAGE FITTED WITH SUCH A DEVICE

CROSS REFERENCE TO RELATED APPLICATIONS

This application is a National Stage of International Application No. PCT/EP2011/057993 filed May 17, 2011, claiming priority based on French Patent Application No. 1053841 filed May 18, 2010, the contents of all of which are incorporated herein by reference in their entirety.

The invention relates to a novel device for driving and blocking an undercarriage having a breaker strut.

BACKGROUND OF THE INVENTION

FIG. 1 is a perspective view of a prior art undercarriage. The undercarriage is mounted to pivot about an axis 5 relative to an aircraft structure between a retracted position and a deployed position, the undercarriage being stabilized in the deployed position by a brace member comprising a breaker strut 2 having two hinged-together connecting rods 2a and 2b. When the undercarriage is in the deployed position, the two connecting rods 2a and 2b are held substantially in mutual alignment by a stabilizing member 3 having two hinged-together links 3a and 3b that are likewise held substantially in mutual alignment by a locking member that comprises, in this example, springs coupled to one of the links in order to urge them towards a substantially-aligned position that is defined by internal abutments.

The strut 2 is coupled firstly to the leg of the undercarriage, and secondly to the structure of the aircraft, while the locking member is coupled firstly to the strut 2 and secondly to the leg, or else to the structure of the aircraft.

It is known to cause the undercarriage to move by making use firstly of a raising actuator, e.g. an actuator 8 coupled to the leg of the undercarriage, and secondly an unlocking actuator 9 that serves to make the locking member inactive.

Thus, starting from the deployed position, the unlocking actuator 9 is actuated initially, which acts against the stabilizing member 3 in order to force the two links of the stabilizing member 3 to move out of alignment, consequently forcing the two connecting rods of the strut to move out of alignment. Once moved out of alignment in this way, they can no longer oppose raising of the undercarriage under drive from the raising actuator.

It is known to use a hydraulic actuator as the unlocking actuator 9. Nevertheless, in order to simplify the management of the various actuators within an aircraft, the person skilled in the art is seeking to replace hydraulic actuators with electric actuators. Electric actuators are already available, but they remain complex, cumbersome to implement, and also to keep in operational condition.

OBJECT OF THE INVENTION

The invention seeks to propose a device for unlocking the locking member that is simple, reliable, and capable of making use of a simple electric actuator.

BRIEF SUMMARY OF THE INVENTION

In order to achieve this object, the invention provides an aircraft undercarriage comprising a leg hinged to the aircraft about a raising axis, the leg being stabilized in the deployed position by a strut comprising two hinged-together connecting rods, the strut being maintained in its aligned position by a stabilizing member comprising two hinged-together links, one of the links being hinged to the strut and another link being hinged to the leg or to the aircraft, said links being held in a substantially aligned and locked position, the undercarriage including an unlocking device comprising:

a rotary actuator of axis parallel to the hinge axis of the links of the stabilizing member;
a crank connected to a shaft of the actuator;
a pawl hinged to the end of the crank and including a step;
a pin secured to and at a distance from one of the links of the stabilizing member; and
return means for urging the pawl towards the pin;
the crank (63) being actuatable between a first angular position in which the pin (31) is in contact with the pawl (64) facing the step (65) while the links are substantially in alignment, and a second angular position that the crank (63) reaches when the step (65) of the pawl (64) has pushed back the pin (31), taking the links (3a, 3b) of the stabilizer member (3) out of alignment.

Thus, the unlocking device enables the stabilizing member to be released using an actuator that is simple, and without any permanent connection being established between the links of the stabilizing member and the actuator, such that if the actuator jams, the undercarriage can still be operated.

In this respect, and in a particular embodiment, the unlocking device includes an emergency control enabling the pawl to be separated from the pin in the event of the actuator failing while lowering the undercarriage.

In a particular embodiment, the unlocking device also makes it possible to block the links of the stabilizing member in a substantially aligned position.

Advantageously, the link that carries the pin includes an escape wheel co-operating with the pawl to separate the pawl from the pin during the movement of the actuator from the first angular position to the second angular position.

BRIEF DESCRIPTION OF THE DRAWINGS

The invention can be better understood in the light of the figures of the accompanying drawings given by way of non-limiting example, and in which, in addition to above-described FIG. 1:

FIG. 2 is a simplified view of an undercarriage in a particular embodiment of the invention;
FIG. 3 is an enlarged view of the unlocking device forming part of the undercarriage shown in FIG. 2, in a particular embodiment of the invention;
FIG. 3a is a fragmentary view of the unlocking device shown in FIG. 3 in another embodiment of the invention;
FIGS. 4a to 4d are views of the same unlocking device, showing it in various stages during the raising of the undercarriage;
FIGS. 5a to 5d are views of the same blocking device, showing it at various stages in the deployment of the undercarriage;
FIGS. 6a to 6d are views of the same unlocking device, showing it at various stages in the deployment of the undercarriage in the event of the rotary actuator failing; and
FIG. 7 is a view of the unlocking device of the invention including emergency control means.

DETAILED DESCRIPTION OF THE INVENTION

Figure 1:
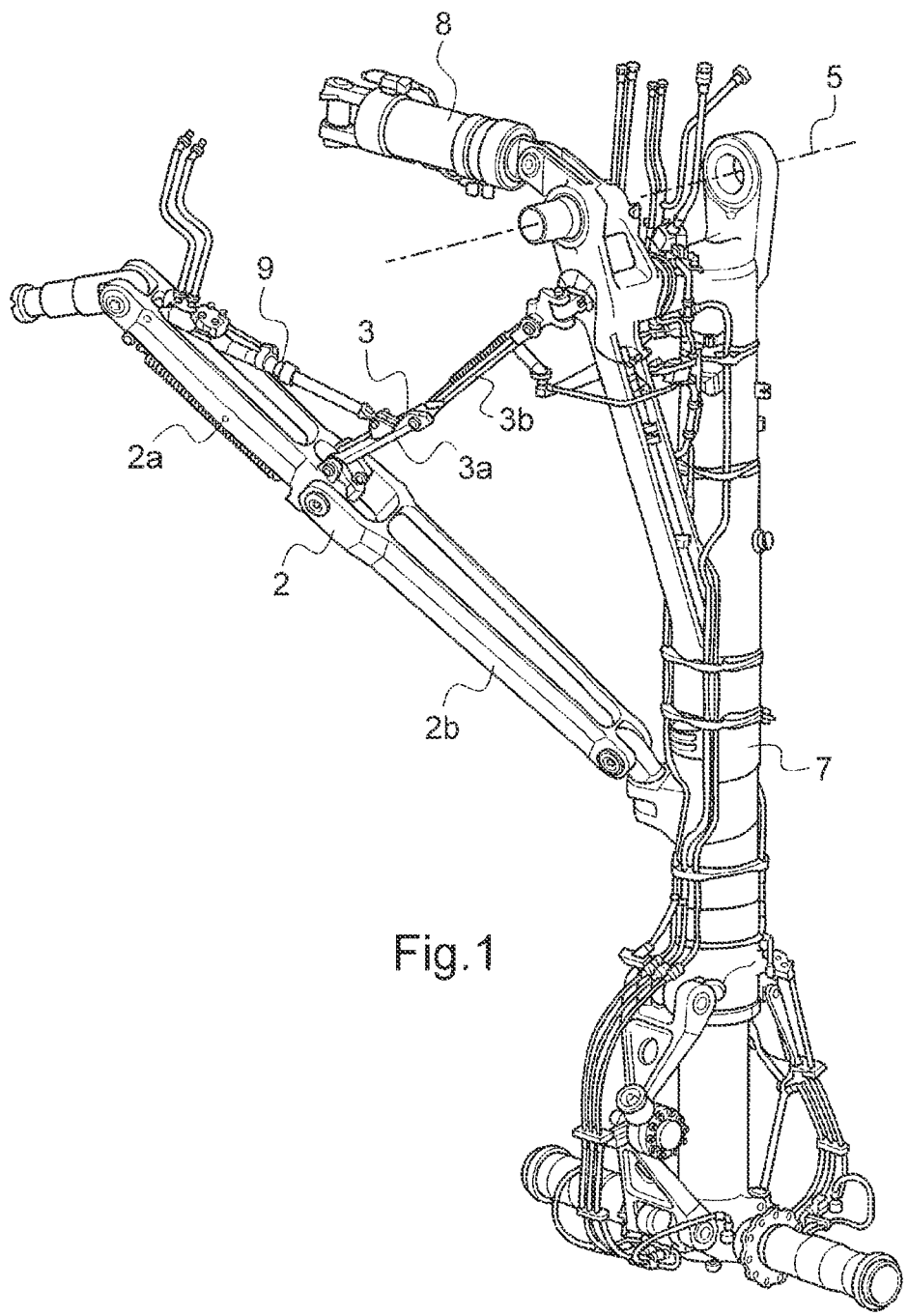

With reference to FIG. 2, and as already stated with reference to FIG. 1, the undercarriage of the invention comprises a leg 7 hinged to the aircraft about a raising axis 5 perpendicular to the plane of the figure. It also comprises a brace member comprising a strut 2 itself made up of two connecting rods 2a and 2b that are hinged together at a knee 4 and that are coupled respectively to the leg 7 and to the aircraft. The connecting rods 2a and 2b of the strut 2 are held in a substantially aligned position by a stabilizing member 3 comprising two hinged-together links 3a and 3b, one of the links 3a being hinged to the strut 2 and the other link 3b being hinged to the leg, said links 3a and 3b being held in a substantially aligned position and locked in that position by at least one locking member comprising a locking spring 10 that urges the links towards a substantially aligned position as defined by an abutment 12. The locking spring 10 makes it possible to avoid accidentally breaking the alignment of the stabilizing member, but it requires a large force in order to break this alignment deliberately when raising the undercarriage. The substantially aligned position of the links 3a and 3b of the stabilizing member 3 is determined by an abutment 12 comprising two half-abutments 12a and 12b that are mounted on respective ones of the links 3a and 3b and that co-operate to block movement of the stabilizing member 3.

With reference now to FIG. 3, according to the invention, the undercarriage is fitted with an unlocking device 6, which in this example comprises:

a support 61 capable of being attached to the aircraft or to the leg 7;

a rotary actuator 62, fastened to a support 61 and of axis parallel to the axis of the links 3a and 3b of the stabilizing member;

a crank 63 connected at one of its ends to the rotary shaft of the actuator 62;

a pawl 64 hinged to the end of the crank 63 and comprising a body in which there is formed a step 65 and a rod 68 extending the body beyond the step;

a pin 31 secured to and at a distance from the stabilizing member 3 and placed on one of the links 3b;

an escape wheel 32 placed on the same link 3b as the pin 31; and a spring 67 urging the pawl 64 towards the pin 31.

FIG. 3 also shows the abutment 12 in a position in which the half-abutments 12a and 12b are in contact and guarantee that the links 3a and 3b are in alignment. In this position, the step 65 is arranged in the pawl 64 in such a manner that it is not in contact with the pin 31.

FIGS. 4a to 4d show the operation of the unlocking device 6 when the undercarriage goes from the deployed position to the retracted position. FIG. 4a shows the actuator 2 in a first angular position D corresponding to the undercarriage being deployed, in which the pin 31 is in contact with the pawl 64 facing the step 65. The links 3a and 3b of the stabilizing member 3 are placed in the substantially aligned position by the half-abutments 12a and 12b that are mounted respectively on the links 3a and 3b and that form an abutment 12.

As shown in FIG. 4b, the actuator is then actuated in the direction represented by the arrow, thereby pushing the pawl (arrow P) against the link 3b via the step 65 and the pin 31, and consequently breaking the alignment of the links 3a and 3b of the stabilizing member 3. The actuator 2 continues to move until the pawl 64 comes into contact with the escape wheel 32. This wheel pushes back the pawl 64 and breaks the thrust between the pin 31 and the pawl 64, as shown in FIG. 4c. The actuator 62 is shown in this figure in a second angular position R in which it thus no longer exerts thrust against the link 3b of the stabilizing member 3. The raising actuator 8 then takes over to cause the undercarriage to be raised. While it is being raised, the pin 31 moves further and further away from the pawl 64, with the escape wheel 32 sliding on the body of the pawl 64. FIG. 4d shows the unlocking device 6 when the undercarriage is in the retracted position.

FIGS. 5a to 5d show the process of deploying the undercarriage. Prior to deploying the undercarriage, the actuator 2 is caused to return from its second position R to its first position D, the escape wheel 32 sliding on the body of the pawl 64 without the escape wheel 32 coming into co-operation with the step 65, as shown in FIGS. 5a and 5b. In a second stage, the raising actuator 8 deploys the undercarriage by causing the link 3a to pivot and moving the pin 31 closer to the step 65. The pin 31 comes into contact with the rod 68 of the pawl 64 such that the escape wheel 32 separates from the pawl 64, as shown in FIG. 5c. At the end of the stroke, the abutments 12a and 12b come into contact so as to form the abutment 12 and hold the links 3a and 3b stationary relative to each other in the substantially aligned position.

FIGS. 6a to 6d show the operation of the unlocking device 6 in the event of a possible failure of the actuator 2, with the actuator remaining blocked in the second angular position R. As shown in FIGS. 6a to 6c, the escape wheel 32 then enables the pawl 64 to be pushed back and to prevent the pin 31 from coming into abutment against the step 65 while the undercarriage is being deployed, where that would otherwise have the effect of blocking the links 3a and 3b in a position out of alignment unsuitable for stabilizing the strut 2. FIG. 6d shows the unlocking device 6 after the position of the actuator 2 has been reinitialized by means external to the device, e.g. manual means.

For this purpose, the unlocking device 6 may include an emergency actuator 92, as shown in FIG. 7, suitable for being actuated manually or advantageously by an actuator 90 coupled to the pawl 64 via an arm 91 and enabling the pawl 64 to be unlocked in the event of the actuator 2 jamming in a position intermediate between the first and second angular positions, so as to allow the undercarriage to be deployed fully.

The invention as described above enables simple rotary actuators to be used that are light in weight and reliable, such as stepper electric motors, with this being made possible by an arrangement of simple and reliable mechanical parts. Furthermore, the undercarriage can always be unblocked by simple external action, regardless of the blocking situation since the connection between the actuator and the stabilizing member is not a permanent connection.

The invention is not limited to the above description, but on the contrary covers any variant coming within the ambit defined by the claims.

In particular, FIG. 3a shows a variant embodiment of the invention in which the substantially aligned position of the links 3a and 3b is provided by co-operation between the pin 31 and the step 65 forming an abutment 66. In this variant, the unlocking actuator 6 serves to block the stabilizing member 3 in the substantially rectilinear position as a replacement for or in addition to an abutment 12 placed on the links 3a and 3b. For this purpose, the step 65 is formed in the pawl 64 in such a manner that when the links 3a and 3b are substantially in alignment, the pin 31 is in contact with the step 65 while the actuator is in its first angular position.

The unlocking device 6 may be placed on the aircraft, on the strut 2, or on the leg 7 of the undercarriage. These various locations do not modify the device or its operation in any way. For this purpose, the support 61 of the unlocking device 6 is optional, it being possible for the actuator 2 to be mounted directly on the aircraft, on the strut 2, or on the leg 7.

In addition, the return means of the pawl 64 urging it to bear against the pin 31 may include, in addition to or as a replacement for the spring 67, a torsion spring on the hinge between the crank 63 and the pawl 64.

Finally, the escape wheel 32 allows the pawl 64 to escape in the event of the actuator 2 becoming blocked in its second angular position. Nevertheless, this arrangement is not essential. Other means could be envisaged, and in particular it is possible to lengthen the rod 68 of the pawl 64 so that it bears continuously against the pin 31. The operation of the unlocking device 6 would then be substantially the same as that described with reference to FIGS. 4a to 4d and 5a to 5d, the pin 31 sliding on the rod 68 without losing contact thereagainst.

The invention claimed is:

1. An aircraft undercarriage comprising a leg hinged to the aircraft about a raising axis, the leg being stabilized in the deployed position by a strut comprising two hinged-together connecting rods, the strut being maintained in its aligned position by a stabilizing member comprising two hinged-together links, one of the links being hinged to the strut and another link being hinged to the leg or to the aircraft, said links being held in a substantially aligned and locked position, wherein the undercarriage includes an unlocking device comprising:

a rotary actuator of axis parallel to the hinge axis of the links of the stabilizing member;

a crank connected to a shaft of the actuator;

a pawl hinged to the end of the crank and including a step;

a pin secured to and at a distance from one of the links of the stabilizing member; and return means for urging the pawl towards the pin;

the crank being actuatable between a first angular position in which the pin is in contact with the pawl facing the step while the links are substantially in alignment, and a second angular position that the crank reaches when the step of the pawl has pushed back the pin, taking the links of the stabilizer member out of alignment, the pin sliding on the pawl without losing contact with the pawl.

2. An undercarriage according to claim 1, wherein the link that carries the pin includes an escape wheel co-operating with the pawl to separate the pawl from the pin during the movement of the actuator from the first angular position to the second angular position.

3. An undercarriage according to claim 1, wherein the unlocking device includes an emergency control enabling the pawl to be separated from the pin in the event of the actuator failing while lowering the undercarriage.

4. An undercarriage according to claim 1, wherein the links are held in a substantially aligned position by the pin co-operating with the step when the actuator is in its first angular position.

* * * * *